A. J. HENTSCHEL.
ANIMAL HOPPLE.
APPLICATION FILED MAY 16, 1913.
1,098,624.
Patented June 2, 1914.
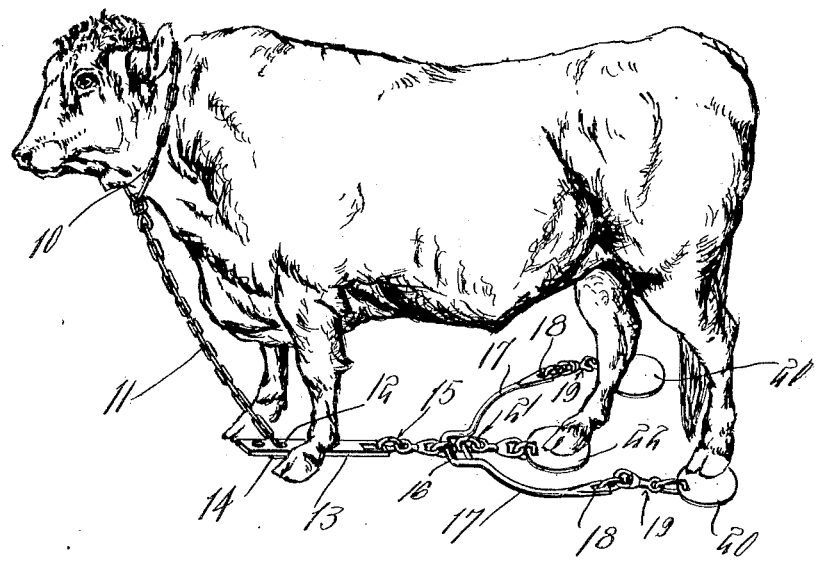
Fig. 1.
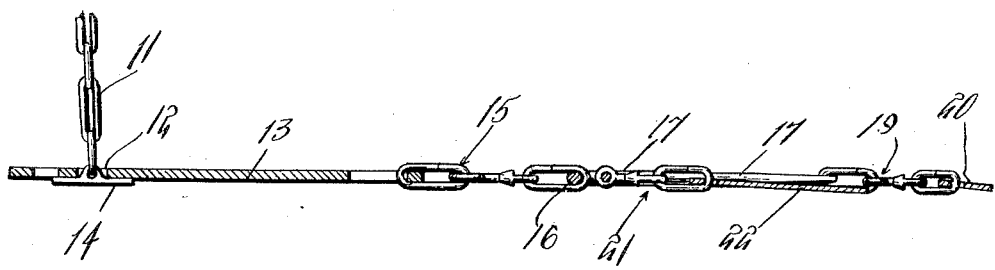
Fig. 2.
Witnesses
Inventor
A. J. Hentschel.
Attorneys

UNITED STATES PATENT OFFICE.

ANDREW J. HENTSCHEL, OF SCHULENBURG, TEXAS.

ANIMAL-HOPPLE.

1,098,624.  Specification of Letters Patent.  Patented June 2, 1914.

Application filed May 16, 1913. Serial No. 768,093.

*To all whom it may concern:*

Be it known that I, ANDREW J. HENTSCHEL, a citizen of the United States, residing at Schulenburg, in the county of Fayette, State of Texas, have invented certain new and useful Improvements in Animal-Hopples; and I do hereby declare the following to be a full, clear, and exact description of the invention, such as will enable others skilled in the art to which it appertains to make and use the same.

This invention relates to improvements in animal hopples and particularly to devices for preventing animals jumping fences or permitting any other undesirable acts.

The principal object is to provide a device to be worn by the animal which means is dragged on the ground and which when the animal steps upon it will act as a check to prevent the animal rearing up in the front.

Other objects and advantages will be apparent from the following description when taken in connection with the accompanying drawings.

In the drawings: Figure 1 is a perspective view of the device applied. Fig. 2 is an enlarged longitudinal sectional view of the device.

Referring particularly to the accompanying drawings, 10 represents a collar which is shown in the form of a chain and is placed around the animal's neck. This collar being of any other desired form as a strap, or the like. The end of this collar extends downwardly and rearwardly between the animal's front legs as shown at 11. This chain 11 is passed through an opening 12 in an elongated metal plate or bar 13, the chain having a cross bar 14 to hold the same from sliding through the opening of the bar 13. At the opposite end of the bar 13 is secured a swivel link 15, and engaging with this link is the middle or eye portion 16 of a branched bar 17. The free end of each of the branches is slotted as indicated at 18 and secured within this slot is a swivel link 19, and to the other end of this link is secured a tread plate 20. Thus the plate 20 is permitted free dragging movement. Also connected to the middle or eye portion 16 of the bar 17 by a swivel link 21 is another tread plate 22, this being disposed between the plates 20 and slightly in advance of the same. The plate or bar 13, the bar 17 and the attached plates 20 and 22 are all adapted to lie flat on the ground, and be dragged by the animal as it walks, these plates being dragged in a position to be stepped upon by the animal's hind feet. It will thus be seen that should the animal attempt to rear up, as in the act of jumping a fence, it would step on one of the tread plates and cause a pull on the collar, which would result in a downward pull on its head and prevent any raising up in the front. This device will also be effective in preventing the animal running, as for instance, a horse in preparing to leap a fence, and also to prevent an animal doing damage to life or property. It will also be seen that in view of the fact that the device drags on the ground, it will be impossible for the animal to lift the same to any great distance, and that a single wire fence of approximately two feet in height will effectively prevent escape of the animal. This device will also be effective in preventing calves from escaping through wire fences.

What is claimed is:

1. An animal hopple comprising a collar for an animal's neck, an elongated plate having openings in its opposite ends, a chain forming a part of the collar and connected to the bar, a bifurcated bar swiveled to the opposite end of the bar, tread plates swiveled to the branches of the furcated bar, and an auxiliary tread plate swiveled to the middle portion of the said bifurcated bar, the last mentioned plate being between and in advance of the first named plates.

2. A hopple device for animals comprising a plurality of plates adapted to be dragged on the ground and be stepped upon, a collar carried by the animal and a connecting chain between the collar and plates.

In testimony whereof, I affix my signature, in the presence of two witnesses.

ANDREW J. HENTSCHEL.

Witnesses:
HENRY G. STOWE,
HARRY G. MEYER.